United States Patent

Carriel

[15] 3,689,517
[45] Sept. 5, 1972

[54] NICKEL TRITHIOCARBONATE COMPOUNDS

[72] Inventor: Jonathan Turner Carriel, South Nyack, N.Y.

[73] Assignee: The International Nickel Company, Inc., New York, N.Y.

[22] Filed: April 7, 1971

[21] Appl. No.: 132,163

[52] U.S. Cl.................260/439 R, 23/114, 23/357, 23/358, 260/45.75 N, 424/295
[51] Int. Cl............................C07f 15/04, A01n 9/20
[58] Field of Search.................................260/439 R

[56] References Cited

UNITED STATES PATENTS

| | | | |
|---|---|---|---|
| 3,446,871 | 5/1969 | Maxfield | 260/439 R |
| 3,472,887 | 10/1969 | Carriel et al. | 260/439 R |
| 3,494,945 | 2/1970 | Lewis et al. | 260/439 R |

Primary Examiner—Delbert E. Gantz
Assistant Examiner—A. P. Demers
Attorney—Maurice L. Pinel

[57] ABSTRACT

Novel derivatives of triammino nickel trithiocarbonate are prepared by reacting the latter with ethylenediamine or diethylenetriamine. Triammino nickel trithiocarbonate and the derivatives thereof, e.g., ethylene-diamine bis-(diammino nickel trithiocarbonate) are effective as light stabilizing additives in polymers and as fungicides.

13 Claims, No Drawings

NICKEL TRITHIOCARBONATE COMPOUNDS

This invention relates to novel derivatives of triammino nickel trithiocarbonate, to methods of preparing these compounds and to the use of these compounds for improving the light stability of polymers and as agricultural chemicals for the control of plant fungi.

Nearly all plastics are degraded by extended exposure to outdoor weathering. Much of the weathering which occurs is directly attributable to exposure to light, and particularly, to the ultra-violet component thereof. Polyvinylchloride (PVC), a commercially important polymer, is particularly light-sensitive and suffers extensive degradation including both discoloration and embrittlement upon exposure to light. Many attempts have been made to stabilize these light sensitive polymers by introducing various additives, and some improvement in their stability upon exposure to light has been effected in a number of cases. However, more effective and more economical stabilizers are needed.

In the field of agriculture it is well recognized that many plant diseases are caused by fungi and extensive plant damage and loss of crops is attributed thereto. The search for new fungicides is a continuing one for a variety of reasons. For example, a fungicide may have special merit only for its effectiveness against a particular disease of one species of plant. Other fungicides will be required for other diseases of the same plant. Thus, there is no universally applicable fungicide, and fungicides which are effective to some degree against the same plant diseases are not necessarily equally effective. In some cases, it is desired to apply the fungicide to the foliage of the plant, and in other cases it is desirable to employ fungicides as soil fumigants; different fungicides will usually be required according to the method of application. Occasionally, the use of an effective fungicide may have to be discontinued due to undesirable side effects and a substitute fungicide is then required. Cost of the fungicide is also an important factor where treatment of substantial acreage is involved, and this may sway the balance in favor of one fungicide or another. It is thus seen that a varied armament of fungicides is required.

Novel compounds have now been discovered which have the capacity to improve the stability of polymer systems against degradation upon exposure to light and which also exhibit activity against organisms which cause certain plant diseases.

It is an object of the present invention to provide a process for preparing derivatives of triammino nickel trithiocarbonate.

Another object of this invention is to provide novel derivatives of triammino nickel trithiocarbonate.

A further object of this invention is to provide a method for improving the stability of polymers against degradation by light.

Still another object of the invention is to provide a polymer system, e.g., one including PVC, which exhibits improved stability against degradation by light.

Yet another object of the invention is to provide a method for controlling organisms which cause particular plant diseases.

Further objects and advantages will become apparent from the following description.

Generally speaking, one feature of the present invention contemplates a new class of nickel compounds of low solubility and improved stability which are generally formulated as $[L]_x[(NH_3)_yNiCS_3]_z$ in which L is an electron donor type ligand co-ordinated to the nickel trithiocarbonate ($NiCS_3$) and is selected from the group consisting of ethylenediamine (EDA) and diethylenetriamine (DETA), $x$ is a small whole number from 1 to 3, $y$ is a small whole number from 0 to 2 and $z$ is either 1 or 2; provided that when $x$ is 1, $z$ is 2 and, when $x$ is greater than 1, $y$ is 0, and further, that when $y$ is 0, $z$ must be 1.

The aforesaid new compounds are derived from triammino nickel trithiocarbonate and can be prepared by reacting an electron donor type ligand selected from the group consisting of ethylenediamine and diethylenetriamine with triammino nickel trithiocarbonate in water, and, advantageously, carrying out the reaction under an inert gas blanket such as nitrogen or argon to avoid oxidation of the reaction product. When the reaction is complete (the reaction period required varying between 3 and 24 hours), the reaction product is separated from the liquid, e.g., by filtration, washed with water or other appropriate nonreactive solvent, preferably under an inert gas blanket to remove excess reactants, i.e., the ligand or triammino nickel trithiocarbonate. The reaction period is considered to be substantially complete when the washed product shows markedly less color than the triammino nickel trithiocarbonate solution which has an intense red color. The water is then removed from the reaction product by flushing with methanol or other appropriate nonreactive solvent and the product thereafter dried to constant weight, preferably in a slow stream of dry nitrogen under reduced pressure. Particular compounds can be formed by controlling the molar ratio of the ligand to the triammino nickel trithiocarbonate.

Another aspect of the invention contemplates a process for improving the stability of polymers against degradation by light which involves incorporating therein a small but effective amount of a nickel trithiocarbonate compound, i.e., triammino nickel trithiocarbonate or a derivative thereof. In accordance with this invention improvement in light-stability may be effected in polymers including vinyl polymers, such as polyvinylchloride and polyvinyl acetate, and other polyolefins, such as polyethylene and polypropylene.

Polymers, and especially vinyl polymers, are stabilized against degradation by light by incorporating therein a nickel trithiocarbonate compound, for example ethylenediamine bis-(diammino nickel trithiocarbonate) or diethylenetriamine bis-(diammino nickel trithiocarbonate), in an effective amount of up to 10 parts by weight thereof per 100 parts by weight of polymer. It is contemplated that an addition of stabilizer as low in amount as 0.1 part by weight thereof per one hundred parts by weight of polymer will tend to improve the stability of the polymer. Ordinarily, one part by weight of the stabilizing compound per one hundred parts by weight of the polymer will be sufficient to obtain the desired degree of stabilization.

In another aspect of this invention, that directed to the use of the novel compounds as fungicides, a fungicidal composition containing a carrier and a nickel trithiocarbonate compound; i.e., triammino nickel trithiocarbonate or a derivative thereof, is provided. Plants may be sprayed with such fungicidal composition, or the composition may be introduced into the fungus-infested soil. The compounds of the invention exhibit fungicidal activity in amounts as low as 100 parts per million (ppm) although higher concentrations can be used without excessive damage to the plants. In preparing the fungicidal compositions, the compounds are slurried in a suitable medium, such as acetone, and then diluted in water to the desired concentration. The compounds may also be incorporated in a wettable powder composition for application by dusting. In treating soil, the compositions may be injected into the soil or sprayed or dusted on the soil surface prior to plowing and then turned into the soil when the field is plowed preparatory to planting.

Triammino nickel trithiocarbonate, $(NH_3)_3NiCS_3$, is the intermediate compound from which the compounds of the invention are prepared. It is generally known that triammino nickel trithiocarbonate can be prepared by reacting nickel hydroxide with aqueous ammonia and carbon disulfide. However, such a process is not commercially attractive because nickel hydroxide is relatively expensive and tends to contaminate the triammino nickel trithiocarbonate reaction product. Moreover, reaction times are uncertain and yields unacceptable. More attractive commercially is a process involving reacting, at room temperature and above, nickel sulfate or other nickel salts such, for example, as chloride, acetate, nitrate, bromide or sulfamate, a concentrated aqueous solution of ammonia and carbon disulfide. A typical reaction of this kind is believed to take place according to the following equation:

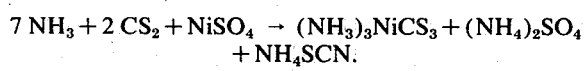

The yield, rate of reaction and quality of the triammino nickel trithiocarbonate obtained are improved when the $NH_3$:Ni ratio is 11:1 or greater, e.g., about 16:1 to about 20:1 or even higher. The proportional molar ratio of $CS_2$:Ni should be maintained at about 2:1 or slightly above, e.g., 2.1:1.

Thus, triammino nickel trithiocarbonate was prepared by combining at least 11 moles of $NH_3$ as a 28 percent aqueous solution with a 1 molar aqueous solution of nickel sulfate and about two moles of carbon disulfide ($CS_2$). These constituents were allowed to react for a period longer than 16 hours at room temperature. Triammino nickel trithiocarbonate precipitated during the reaction and was separated from the other reaction products by filtration, washed in ammonia water and then dried. The yield was over 90 percent of the calculated theoretical yield. It has been found that under the conditions set forth above, increasing the initial $NH_3/CS_2$ ratio has the effect of increasing the product yield. The triammino nickel trithiocarbonate is preferably formed at room temperature and atmospheric pressure although the reaction can be carried out at somewhat higher temperatures and pressures.

Triammino nickel trithiocarbonate can also be prepared in a relatively pure form by first reacting aqueous ammonia and carbon disulfide to form ammonium trithiocarbonate, $(NH_4)_2CS_3$, and then reacting the ammonium trithiocarbonate thus formed with nickel sulfate.

For the purpose of giving those skilled in the art a better understanding of certain features of the invention, the following five illustrative examples are given demonstrating the preparation of derivatives of triammino nickel trithiocarbonate.

EXAMPLE I

One mole of ethylenediamine was mixed with two moles of triammino nickel trithiocarbonate and four liters of water under an inert gas blanket of nitrogen. The solution was then filtered and the filtered reaction product washed with water under the inert gas. Most of the casual water was then flushed out with methanol and the product dried to constant weight in a slow stream of dry nitrogen under reduced pressure. The product has a dark red color and was identified as ethylenediamine bis-(diammino nickel trithiocarbonate), EDA $[(NH_3)_2NiCS_3]_2$ (Compound 1). Chemical analysis showed the product to have the following composition.

TABLE I

| Element | Observed (%) | Calculated (%) |
|---------|--------------|----------------|
| C  | 9.9  | 10.4 |
| H  | 4.1  | 4.4  |
| N  | 18.0 | 18.2 |
| Ni | 25.3 | 25.4 |
| S  | 42.7 | 41.6 |
|    | (by difference) | (by difference) |

The yield of ethylenediamine bis-(diammino nickel trithiocarbonate) was substantially quantitative.

EXAMPLE II

Six moles of ethylenediamine were mixed with one mole of triammino nickel trithiocarbonate and 2 liters of water under an inert gas blanket of nitrogen. The solution was then filtered and the filtered reaction product washed with water under the inert gas blanket. Most of the casual water was then flushed out with methanol and the product dried to constant weight in a slow stream of dry nitrogen under reduced pressure. The product had a brownish-yellow color, a density of about 1.44 grams per cubic centimeter, decomposed starting at about 175° C., and was identified as tris-(ethylenediamine)nickel trithiocarbonate, $(EDA)_3NiCS_3$ (compound 2). Chemical analysis showed the product to have the following composition:

TABLE II

| Element | Observed (%) | Calculated (%) |
|---------|--------------|----------------|
| C  | 23.8 | 24.2 |
| H  | 6.9  | 7    |
| N  | 23.8 | 24.2 |
| Ni | 17.1 | 16.9 |
| S  | 28.4 | 27.7 |
|    | (by difference) | (by difference) |

The yield of tris-(ethylenediamine)nickel trithiocarbonate was substantially quantitative.

EXAMPLE III

One mole of diethylenetriamine was mixed with three moles of triammino nickel trithiocarbonate and 6 liters of water under an inert gas blanket. The solution was then filtered and the filtered reaction product washed with water under an inert gas blanket. Most of the casual water was then flushed out with methanol and the product dried to constant weight in a slow stream of dry nitrogen under reduced pressure. The product had a dark red color and was identified as diethylenetriamine bis-(diammino nickel trithiocarbonate), DETA $[(NH_3)_2NiCS_3]_2$ (Compound 3). The nickel content of the compound was 17.1 percent by analysis, which is in good agreement with the calculated nickel content of 16.9 percent. The yield of diethylenetriamine bis-(diammino nickel trithiocarbonate) was substantially quantitative.

EXAMPLE IV

Five moles of diethylenetriamine were mixed with one mole of triammino nickel trithiocarbonate and 1 liter of water under an inert gas blanket of nitrogen. The solution was then filtered and the filtered reaction product washed with water under the inert gas blanket. Most of the casual water was then flushed out with methanol and the product dried to constant weight in a slow stream of dry nitrogen under reduced pressure. The product had a pink color, decomposed starting at about 207° C. and was identified as bis-(diethylenetriamine)nickel trithiocarbonate, $(DETA)_2NiCS_3$ (Compound 4). Chemical analysis showed the product to have the following composition:

TABLE III

| Element | Observed (%) | Calculated (%) |
|---|---|---|
| C | 29.0 | 28.9 |
| H | 7.1 | 7.1 |
| N | 22.5 | 22.5 |
| Ni | 14.9 | 15.7 |
| S | 26.5 (by difference) | 25.8 (by difference) |

The yield of bis-(diethylenetriammine)nickel trithiocarbonate was substantially quantitative.

EXAMPLE V

A portion of the ethylenediamine bis-(diammino nickel trithiocarbonate) produced in Example I was continuously leached with water for about 5 hours at about 45° C. under reduced pressure of about 6.5 cm of Hg. The resulting product had a dark purple color, a density of about 1.8 grams per cubic centimeter decomposed starting at about 140° C. and was identified as ethylenediamine bis-(ammino nickel trithiocarbonate), EDA $(NH_3NiCS_3)_2$ (Compound 5). Chemical analysis showed the product to have the following composition

TABLE IV

| Element | Observed (%) | Calculated (%) |
|---|---|---|
| C | 10.8 | 11.2 |
| H | 3.9 | 3.3 |
| N | 14.9 | 13.1 |
| Ni | 27.6 | 27.4 |
| S | 42.8 (by difference) | 45.0 (by difference) |

The yield of ethylenediamine bis-(ammino nickel trithiocarbonate) was substantially quantitative.

The preparation of polymer compositions containing nickel trithiocarbonate compounds as light stabilizers calls for dry-mixing the polymer with the stabilizing nickel compound, for example, in a small but effective proportion of up to 10 parts by weight of the compound, e.g., 1 part by weight of compound per one hundred parts by weight of the polymer, and with other necessary ingredients at a temperature from about 75° to about 285° F. until the powder mixture is well blended, and then, after cooling, extruding the powder mixture or otherwise processing it to final form. This polymer composition is characterized by a significant ability to resist degradation upon exposure to natural light or strong artificial light for an extended period.

In order to give those skilled in the art a better understanding of that aspect of the invention directed toward stabilization of polymer systems, the following illustrative example is given in which triammino nickel trithiocarbonate and several derivatives thereof, prepared as described in the above examples, are employed as light stabilizers in a polyvinylchloride (PVC) system.

EXAMPLE VI

The compounds listed in the table below were evaluated as light stabilizers by incorporation in polyvinylchloride (PVC) film followed by testing under accelerated weathering conditions. Uninhibited PVC film was similarly tested for purposes of comparison. The addition of nickel trithiocarbonate compound was made in the amount of 1 part by weight of the compound to 100 parts by weight of PVC powder in a sigma blade dry-mixing head of a Brabender Plastograph.

The mixture was heated gradually during mixing until the temperature reached about 230° F. At this temperature, 50 parts by weight of dioctyl phthalate, a plasticizer, was added and when, upon continued heating, the temperature reached about 260° F., 2 parts by weight of an amide-type lubricant (Glycolube RP), was added. A temperature of about 280° F. was finally attained and, as mixing continued, the heating was stopped and air cooling commenced. The product at this point was a free-flowing plasticized powder suitable for extrusion into film at low temperatures (about 330° F). The blended powder was then transferred to an extruder. The extrusion was carried out at a temperature of about 330° F. and a 2-inch wide by 10 mil thick film was produced. The film was cut into samples, each about 9 ½ inches long, which were clamped in suitable holders under slight tension with approximately 8 ½ inches exposed for weathering. Film holders were provided with PVC film samples incorporating the test compounds and with uninhibited PVC film (blanks). The PVC film samples were then exposed to accelerated weathering conditions including simulated sunshine (carbon arc illumination) and rain (water spray) in a suitable testing device (Sunshine Carbon Arc Weather-Ometer). The test cycle included 18 minutes of rain in each 2-hour period of simulated sunshine. Once in every 24-hour period the samples were flexed to determine whether embrittlement had occurred, as indicated by cracking during flexure.

The results obtained in these tests are set forth in the following Table.

TABLE V

| Compound No. | Compound | Hours to Embrittlement |
|---|---|---|
| 1 | Ethylenediamine bis-(diammino nickel trithiocarbonate) | 770 |
| 3 | Diethylenetriamine bis-(diammino nickel trithiocarbonate) | 1006 |
| 4 | Bis-(diethylenetriamine)nickel trithiocarbonate | 770 |
| 6 | Triammino nickel trithiocarbonate | 550 |
|  | Blanks | 229–270 |

The above Table indicates that the uninhibited PVC film samples which were exposed all failed in less than 300 hours. The PVC film samples containing triammino nickel trithiocarbonate (Compound 6) proved to be substantially more stable than the uninhibited PVC film samples. The film samples containing nickel trithiocarbonate compounds derived from triammino nickel trithiocarbonate show a further substantial increment in stability.

Triammino nickel trithiocarbonate and several derivatives thereof, prepared as described above, have also shown useful properties as agricultural chemicals, particularly fungicides. Illustrative examples of the use of these compounds as fungicides are given below. The compounds listed in Table V, as well as tris-(ethylenediamine)nickel trithiocarbonate (Compound 2) were tested.

EXAMPLE VII

The foliar fungicidal activity of the compounds 1 through 4 and 6 was determined against Xanthomas vesicatoria, the fungus which causes bacterial leaf spot of tomatoes. The compounds to be tested were first slurried in acetone and then diluted with deionized water containing wetting and dispersing agents to a concentration of 1,000 ppm. Several groups of tomato plants, approximately six to seven weeks old, in the six to seven leaf-growth stage, were used in this test, each group being sprayed at 35 pounds pressure for 50 seconds with preparations containing one of the compounds. After drying, the treated plants and a group of untreated plants were spray-inoculated at 30 pounds pressure with an aqueous cell suspension of Xanthomas visicatoria containing 5 percent Carborundum and immediately thereafter placed in an incubation chamber which was maintained at 70° F. and a relative humidity of over 95 percent. After 40 hours in the incubation chamber, the plants were removed to a greenhouse for further development of infection lesions. Disease severity was determined by a count of lesions present on six to seven treated leaves, and effectiveness of the compound was determined by a direct comparison with inoculated controls. Thus, the reduction in the number of lesions accomplished by the compound under test is expressed as a percent of the lesions characterizing the inoculated but otherwise untreated plants and this value is termed "Percent Organism Control". The results of the tests are set forth in the following Table.

TABLE VI

| Compound | % Organism Control |
|---|---|
| 1 | 48 |
| 2 | 51 |
| 3 | 61 |
| 4 | 70 |
| 6 | 50 |

Little or no plant damage attributable to the fungicides under test was observed.

The above test results clearly indicate that the nickel compounds tested are active in controlling bacterial leaf spots of tomatoes.

EXAMPLE VIII

The activity of the compounds of Table VII as soil fungicides was determined against the fungus, Rhizoctonia solani. In this test, slurries of the compounds were added to separate units of sterilized soil at a concentration sufficient to obtain twice the final chemical concentration desired (100 ppm). Rhizoctonia solani inoculum was added to sterile soil in an amount sufficient to provide twice the desired final fungal concentration on a dry weight basis, the inoculated soil was placed in a sealed soil blender and thoroughly blended to obtain a homogeneous mixture. The soil units treated with the compound under test were then each added to an equivalent amount of Rhizoctonia-inoculated soil, placed in soil blenders, and thoroughly blended. The resulting blend of Rhizoctonia-inoculated and chemically-treated soil was divided equally into suitable containers, seeded with suitable plant species, water sealed to prevent loss of potential chemical vapor phase and removed to a greenhouse. Similar plantings were made in sterile soil alone and in sterile soil inoculated with Rhizoctonia for purposes of comparison. The control effectiveness of the compounds was determined by actual count of the number of surviving plants in soil which was Rhizoctonia-inoculated and treated with nickel compounds compared with the number of plants surviving in soil which was Rhizoctonia-inoculated but otherwise untreated, and applying a correction based upon the survival rate of plants in untreated sterile soil. The results of these tests are presented in the following Table:

TABLE VII

| Compound No. | % Organism Control |
|---|---|
| 1 | 37 |
| 2 | 50 |
| 3 | 27 |
| 4 | 27 |
| 6 | 23 |

Substantially no plant damage attributable to the nickel compounds was observed.

It is thus seen that the nickel compounds tested have substantial effectiveness against fungus when applied to the soil.

The nickel compounds further displayed activity as insecticides at a concentration of 1,000 ppm. The compounds were slurried in acetone and the slurry then diluted to appropriate concentration in deionized water containing wetting and emulsifying agents. Compounds 1, 2 and 4 effected some control of the Pea Aphid; i.e., as high as 13 percent in the case of Compound 4. Compounds 1 and 3 showed activity against the Mexican Bean Beetle to the extent that Compound 1 effected 20 percent control and Compound 4 effected 40 percent control. In contemporaneous tests certain commercially available compounds were employed against these same fungi and insects. In the case of Xanthomas vesicatonia, streptomycin sulfate effected 52 percent control at a concentration of 100 ppm. With respect to Rhizoctonia solani, pentachloronitrobenzene (PCNB) effected 87 percent control at a concentration of 50 ppm. Against the Pea Aphid, 0,0-Dimethyl S-4-oxo-1,2,3-benzotriazin-3(4H)-ylmethyphosphorodithioate (Guthion) effected 100 percent control at a concentration of 50 ppm. 1-Naphtyl-N-methylcarbamate (Sevin) effected 100 percent control of the Mexican Bean Beetle at a concentration of 25 ppm.

Thus, novel and inexpensive methods have been disclosed for producing new nickel trithiocarbonate compounds. There has also been described a novel method for improving the stability of polymer systems against degradation upon exposure to light and there have further been disclosed novel polymer compositions having improved stability. The novel method and polymer compositions of the invention are particularly beneficial in improving the light stability of vinyl polymers such as polyvinylchloride which may be utilized in the form of rigid structural shapes, e.g., sheets, planks, corrugated board, etc., and can potentially replace wood and other materials in many architectural applications provided the rigid polymer is stabilized to prevent degradation e.g, embrittlement, discoloration, etc., during exposure to outdoor atmospheric conditions and sunlight. PVC in plasticized form may also be stabilized as described. In addition, the nickel trithiocarbonate compounds have been shown to be useful in a method for controlling fungus.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A compound having the structural formula $[L]_x[(NH_3)_yNiCS_3]_z$ in which L is an electron donor type ligand selected from the group consisting of ethylenediamine and diethylenetriamine, $x$ is a small whole number from 1 to 3, $y$ is a small whole number from 0 to 2 and $z$ is either 1 or 2; provided that when $x$ is 1, $z$ is 2 and when $x$ is greater than 1, $y$ is 0, and further, that when $y$ is 0, $z$ must be 1.

2. A compound in accordance with claim 1 selected from the group consisting of ethylenediamine bis-(diammino nickel trithiocarbonate), tris-(ethylenediamine)nickel trithiocarbonate, diethylenetriamine bis-(diammino nickel trithiocarbonate), bis-(diethylenetriamine)nickel trithiocarbonate and ethylenediamine bis-(ammino nickel trithiocarbonate).

3. A compound in accordance with claim 1 which comprises ethylenediamine bis-(diammino nickel trithiocarbonate).

4. A compound in accordance with claim 1 which comprises tris-(ethylenediamine)nickel trithiocarbonate.

5. A compound in accordance with claim 1 which comprises diethylenetriamine bis-(diammino nickel trithiocarbonate).

6. A compound in accordance with claim 1 which comprises bis-(diethylenetriamine)nickel trithiocarbonate.

7. A compound in accordance with claim 1 which comprises ethylenediamine bis-(ammino nickel trithiocarbonate).

8. A process for preparing a compound having the structural formula $[L]_x[(NH_3)_yNiCS_3]_z$ in which L is an electron donor type ligand selected from the group consisting of ethylenediamine and diethylenetriamine, $x$ is a small whole number from 1 to 3, $y$ is a small whole number from 0 to 2 and $z$ is either 1 or 2; provided that when $x$ is 1, $z$ is 2 and when $x$ is greater than 1, $y$ is 0, and further, that when $y$ is 0, $z$ must be 1, which comprises reacting, in water and under an inert gas blanket, an electron donor type ligand selected from the group consisting of ethylenediamine and diethylenetriamine with triammino nickel trithiocarbonate, and thereafter, under an inert gas blanket, separating the reaction product from the liquid medium, washing and drying the reaction product.

9. A process of making ethylenediamine bis-(diammino nickel trithiocarbonate) in accordance with claim 8 which comprises reacting ethylenediamine with triammino nickel trithiocarbonate in an aqueous medium wherein the molar ratio of ethylenediamine: triammino nickel trithiocarbonate is about 1:2.

10. A process of making ethylenediamine bis-(ammino nickel trithiocarbonate) in accordance with claim 9 wherein the ethylendiamine bis-(diammino nickel trithiocarbonate) is continuously leached with water under reduced pressure.

11. A process of making tris-(ethylenediamine) nickel trithiocarbonate in accordance with claim 8 which comprises reacting ethylenediamine with triammino nickel trithiocarbonate in an aqueous medium wherein the molar ratio of ethylenediamine: triammino nickel trithiocarbonate is about 6:1.

12. A process of making diethylenetriamine bis-(diammino nickel trithiocarbonate) in accordance with claim 8 which comprises reacting diethylenetriamine with triammino nickel trithiocarbonate in an aqueous medium wherein the molar ratio of diethylenetriamine: triammino nickel trithiocarbonate is about 1:3.

13. A process of making bis-(diethylenetriamine) nickel trithiocarbonate in accordance with claim 8 which comprises reacting diethylenetriamine with triammino nickel trithiocarbonate in an aqueous medium wherein the molar ratio of diethylenetriamine: triammino nickel trithiocarbonate is about 5:1.

* * * * *